United States Patent
Kang et al.

(10) Patent No.: US 12,489,999 B2
(45) Date of Patent: Dec. 2, 2025

(54) ELECTRONIC DEVICE INCLUDING IMAGE SENSOR AND OPERATING METHOD THEREOF

(71) Applicant: SAMSUNG ELECTRONICS CO., LTD., Suwon-si (KR)

(72) Inventors: Hwayong Kang, Suwon-si (KR); Minyoung Park, Suwon-si (KR); Jaeoh Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 118 days.

(21) Appl. No.: 18/211,665

(22) Filed: Jun. 20, 2023

(65) Prior Publication Data
US 2023/0388677 A1   Nov. 30, 2023

Related U.S. Application Data

(63) Continuation of application No. PCT/KR2022/011867, filed on Aug. 9, 2022.

(30) Foreign Application Priority Data

Oct. 6, 2021 (KR) .................. 10-2021-0132574

(51) Int. Cl.
*H04N 25/772* (2023.01)
*H04N 23/12* (2023.01)
(Continued)

(52) U.S. Cl.
CPC ........... *H04N 25/772* (2023.01); *H04N 23/12* (2023.01); *H04N 23/55* (2023.01); *H04N 25/40* (2023.01); *H04N 25/75* (2023.01)

(58) Field of Classification Search
CPC ...... H04N 25/772; H04N 23/12; H04N 25/75; H04N 25/40; H04N 23/55
(Continued)

(56) References Cited

U.S. PATENT DOCUMENTS

| 7,345,613 B2 | 3/2008 | Higuchi |
| 9,402,039 B2 | 7/2016 | Solhusvik et al. |

(Continued)

FOREIGN PATENT DOCUMENTS

| CN | 110972518 A | 4/2020 |
| EP | 4270928 A1 | 11/2023 |

(Continued)

OTHER PUBLICATIONS

European Search Report Issued in EP Application No. 22878699.2-1207, Mail Date Jun. 20, 2024, 9 Pages.
(Continued)

*Primary Examiner* — Joel W Fosselman
(74) *Attorney, Agent, or Firm* — CANTOR COLBURN LLP

(57) ABSTRACT

An electronic device of an embodiment of the present document may include an image sensor including a unit pixel, and at least one processor electrically connected to the image sensor. The image sensor may read out light quantity data inputted to the unit pixel twice or more with a first conversion gain, and may read out the light quantity data with a second conversion gain lower than the first conversion gain to obtain a first image frame, and present the first image frame to the at least one processor. In addition to this, various embodiments identified through the specification are possible.

20 Claims, 11 Drawing Sheets

(51) Int. Cl.
*H04N 23/55* (2023.01)
*H04N 25/40* (2023.01)
*H04N 25/75* (2023.01)

(58) Field of Classification Search
USPC ........................................................ 348/222.1
See application file for complete search history.

(56) References Cited

U.S. PATENT DOCUMENTS

| | | | |
|---|---|---|---|
| 9,843,738 | B2 | 12/2017 | Cremers et al. |
| 9,948,875 | B2 | 4/2018 | Cremers et al. |
| 10,379,317 | B2 | 8/2019 | Shimokawa et al. |
| 10,510,796 | B1 | 12/2019 | Wang et al. |
| 10,645,315 | B2 | 5/2020 | Shim et al. |
| 10,841,517 | B2 | 11/2020 | Totsuka |
| 11,438,535 | B2 | 9/2022 | Baek et al. |
| 2006/0244866 | A1* | 11/2006 | Kishida ................ G06V 20/52 348/143 |
| 2008/0218602 | A1 | 9/2008 | Kozlowski |
| 2014/0263950 | A1 | 9/2014 | Fenigstein et al. |
| 2016/0286144 | A1 | 9/2016 | Yanai |
| 2017/0208273 | A1 | 7/2017 | Mandelli et al. |
| 2019/0020832 | A1 | 1/2019 | Takane |
| 2020/0162691 | A1* | 5/2020 | Mori ................ H01L 27/14641 |
| 2020/0204718 | A1* | 6/2020 | Hennings ............... H04N 23/71 |
| 2021/0025993 | A1* | 1/2021 | Choi ................ H10F 39/80373 |
| 2021/0233950 | A1* | 7/2021 | Jang .................... H10F 39/8063 |
| 2022/0337774 | A1* | 10/2022 | Oh ........................ H04N 25/59 |

FOREIGN PATENT DOCUMENTS

| | | |
|---|---|---|
| JP | 2008-11284 A | 1/2008 |
| JP | 2018-107792 A | 7/2018 |
| JP | 2019-68318 A | 4/2019 |
| JP | 2021106375 A | 7/2021 |
| KR | 2009-0083817 A | 8/2009 |
| KR | 2017-0056909 A | 5/2017 |
| KR | 2018-0079519 A | 7/2018 |
| KR | 2021-0102644 A | 8/2021 |

OTHER PUBLICATIONS

International Search Report and Written Opinion for International Application No. PCT/KR2022/011867; International Filing Date Aug. 9, 2022; International Search Report Mail Date Nov. 18, 2022; 10 Pages.

* cited by examiner

ELECTRONIC DEVICE INCLUDING IMAGE SENSOR AND OPERATING METHOD THEREOF

TECHNICAL FIELD

The present disclosure relates to a technology for obtaining an image with an improved quality through an image sensor.

BACKGROUND ART

The dynamic range (DR) of a digital image is defined as the ratio of the brightest pixel value to the darkest pixel value (e.g., a floor noise value) within the image. The human visual perception system can handle higher DR than a typical digital camera or monitor. Therefore, an electronic device may have difficulties in obtaining or expressing an image recognized by a human as it is.

An image having a DR greater than a DR that an electronic device can generally handle is referred to as a high dynamic range (HDR) image. The HDR image can have a wider DR than an image obtained with a general digital camera.

An HDR image creation technology includes a multi frame high dynamic range (MF HDR) technology. MF HDR technology is a technology for photographing and synthesizing a plurality of images corresponding to different exposure times and thereby extending a DR. The electronic device can synthesize an HDR image, based on a short exposure image for a bright region and a long exposure image for a dark region. That is, when a difference of brightness is large for each region in one image, the electronic device can synthesize images having different exposure times and thereby obtain an image having a large DR.

DISCLOSURE

Technical Problem

According to MF HDR technology, when a subject moves while a plurality of images corresponding to different exposure times are obtained, an artifact can appear in a created HDR image since a long exposure image and a short exposure image are different. For example, a ghost effect can occur in which images of a moving subject are overlapped.

Also, when an illuminance around an electronic device is less than a predetermined level, the effect of noise can increase because a quantity of light inputted to an image sensor is relatively very small. For example, image quality can be degraded by readout noise that is generated while the image sensor reads out electric charges inputted to a pixel.

Technical problems to be achieved in the present document are not limited to the technical problems mentioned above, and other technical problems not mentioned would be clearly understood by those having ordinary skill in the art to which the present invention belongs from the description below.

Technical Solution

An electronic device of an embodiment of the present document may include an image sensor including a unit pixel, and at least one processor electrically connected to the image sensor. The image sensor may read out light quantity data inputted to the unit pixel twice or more with a first conversion gain, and read out the light quantity data with a second conversion gain lower than the first conversion gain to obtain a first image frame, and present the first image frame to the at least one processor.

An operating method of an electronic device of an embodiment of the present document may include reading out, by an image sensor included in the electronic device, light quantity data inputted to a unit pixel twice or more with a first conversion gain, and reading out the light quantity data with a second conversion gain lower than the first conversion gain to obtain a first image frame, and presenting, by the image sensor, the first image frame to at least one processor included in the electronic device.

An electronic device of an embodiment of the present document may include an image sensor including a unit pixel of a plurality of unit pixels, and at least one processor electrically connected to the image sensor. The image sensor may read out light quantity data inputted to the unit pixel twice or more with a first conversion gain and make an average value to obtain first image data, and read out the light quantity data with a second conversion gain lower than the first conversion gain to obtain second image data and thereby obtain a first image frame based on the first image data and the second image data, and present the first image frame to the at least one processor.

Advantageous Effects

According to various embodiments disclosed in the present document, an electronic device may obtain an HDR image having a small number of artifacts (e.g., a ghost effect) included in an image and having a wide DR.

Also, according to various embodiments disclosed in the present document, the electronic device may obtain an image with a reduced noise even in a low-illuminance environment. The electronic device may obtain an image whose quality is improved as a dark noise is improved and a DR is extended.

Effects obtainable in the present disclosure are not limited to the above-mentioned effects, and other effects not mentioned may be clearly understood by those of ordinary skill in the art to which the present disclosure belongs from the description below.

DESCRIPTION OF DRAWINGS

In connection with a description of the drawings, the same or similar reference numerals may be used for the same or similar components.

MODE FOR INVENTION

Hereinafter, various embodiments of the present invention are mentioned with reference to the accompanying drawings. However, this is not intended to limit the present invention to specific embodiments, and it should be understood that various modifications, equivalents, and/or alternatives of the embodiments of the present invention are included.

Figure 1:
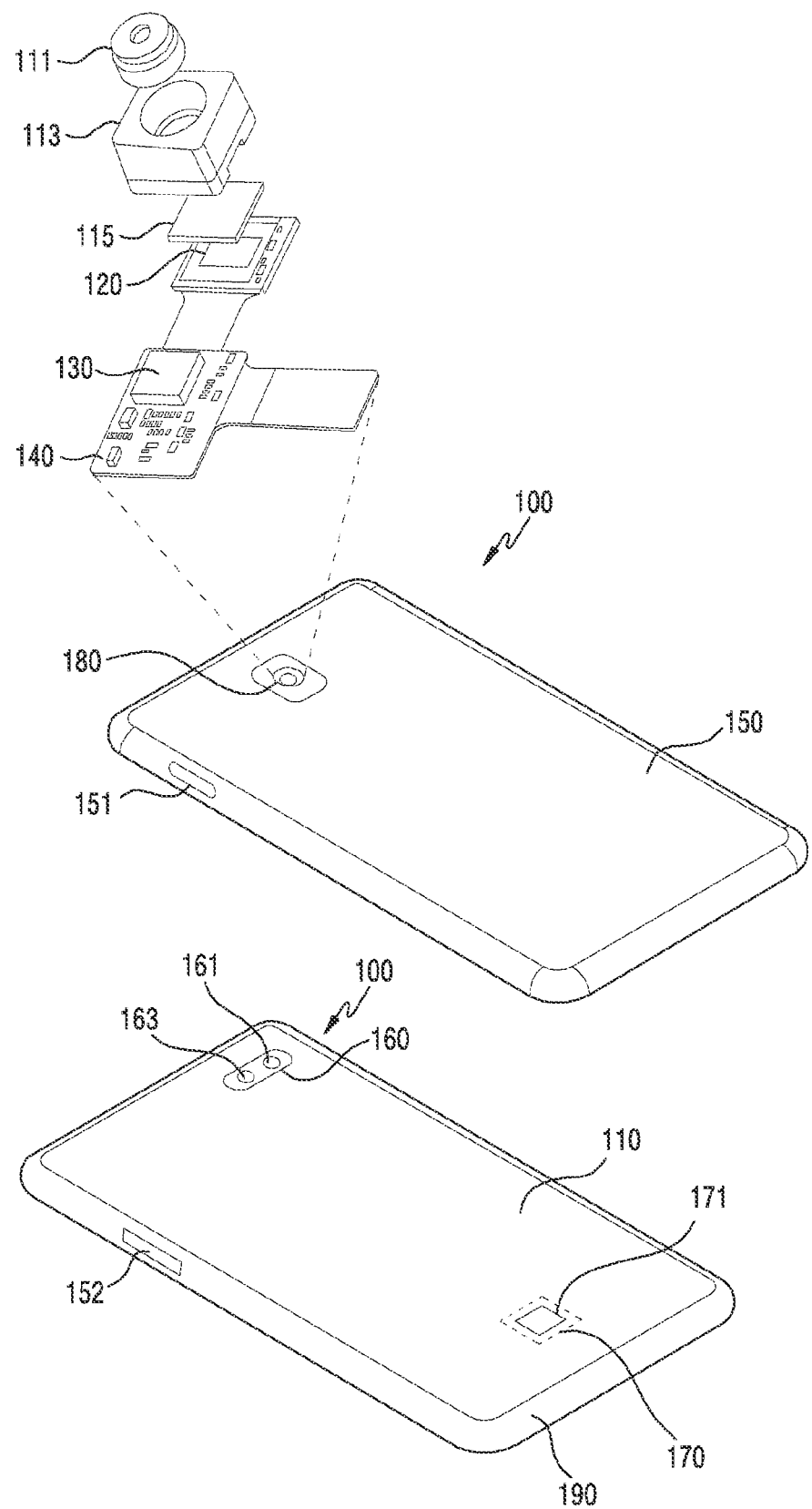
FIG. 1 illustrates a structure of an electronic device and a camera module according to an embodiment.

FIG. 1 illustrates a structure of an electronic device 100 and a camera module 180 according to an embodiment.

FIG. 1 is a diagram schematically illustrating an exterior of the electronic device 100 on which the camera module 180 is mounted, and also illustrates the camera module 180 according to an embodiment. It will be clearly understood by an ordinary technician that the embodiment of FIG. 1 may be applied to an electronic device equipped with a camera among various electronic devices or mobile devices although the embodiment of FIG. 1 has been illustrated and described on the premise of a mobile device, for example, a smart phone.

Referring to FIG. 1, a display 110 may be disposed on a front surface of the electronic device 100 of an embodiment. In an embodiment, the display 110 may occupy most of the front surface of the electronic device 100. The display 110 and a bezel region 190 surrounding at least some edges of the display 110 may be disposed on the front surface of the electronic device 100. The display 110 may include a flat area and a curved area extending from the flat area toward a side surface of the electronic device 100. The electronic device 100 illustrated in FIG. 1 is one example, and various embodiments are possible. For example, the display 110 of the electronic device 100 may include only the flat area without the curved area, or may have the curved area only at an edge of one side, not both sides. Also, in an embodiment, the curved area may extend toward a rear surface of the electronic device and thus the electronic device 100 may have an additional flat area.

According to an embodiment, the electronic device 100 may additionally include a speaker, a receiver, a front camera, a proximity sensor, a home key, and the like. The electronic device 100 of an embodiment may be presented in which a rear cover 150 is integrated with a main body of the electronic device 100 as well. In another embodiment, the electronic device 100 may be configured to permit replacement of a battery by separating the rear cover 150 from the main body of the electronic device 100. The rear cover 150 may be referred to as a battery cover or a back cover as well.

In an embodiment, a fingerprint sensor 171 for recognizing a user's fingerprint may be included in a first region 170 of the display 110. Since the fingerprint sensor 171 is disposed beneath the display 110, the fingerprint sensor 171 may not be recognized by a user or may be difficult to be recognized. Also, in addition to the fingerprint sensor 171, a sensor for additional user/biometric authentication may be disposed in a partial region of the display 110. In an embodiment, the sensor for user/biometric authentication may be disposed in one section of the bezel region 190. For example, an IR sensor for iris authentication may be exposed through one region of the display 110, or may be exposed through one section of the bezel region 190.

In an embodiment, a front camera 161 may be disposed in a second region 160 on the front surface of the electronic device 100. In the embodiment of FIG. 1, the front camera 161 is shown to be exposed through one region of the display 110, but in another embodiment, the front camera 161 may be exposed through the bezel region 190. In another embodiment (not shown), the electronic device 100 may include at least one of an audio module (e.g., an audio module 1070 of FIG. 10), a sensor module (e.g., a sensor module 1076 of FIG. 10, or a sensor 163), a camera module (e.g., a camera module 1080 of FIG. 10, or a front camera 161), and a light emitting device (not shown), disposed on a back surface of the second region 160 of the display 110. For example, the camera module 180 may be disposed on the front surface and/or side surface of the electronic device 100, to face forwardly and/or sideways. For example, the front camera 161 may not be visually exposed to the second region 160, and may include a hidden under display camera (UDC).

In an embodiment, the electronic device 100 may include one or more front cameras 161. For example, the electronic device 100 may include two front cameras, such as a first front camera and a second front camera. In an embodiment, the first front camera and the second front camera may be cameras of a same or similar type having same or similar specifications (e.g., pixels), but the first front camera and the second front camera may also be implemented as cameras of different specifications. The electronic device 100 may support a function related to a dual camera configuration (e.g., 3D imaging, auto focus (AF), etc.) through the two front cameras. A description of the above-mentioned front camera may be applied equally or similarly to a rear camera of the electronic device 100.

In an embodiment, various kinds of hardware or sensors 163 to assist photographing, such as a flash, may be additionally disposed in the electronic device 100. For example, the electronic device 100 may include a distance sensor (e.g., a TOF sensor) for detecting a distance between a subject and the electronic device 100. The distance sensor may be applied to both the front camera and/or the rear camera. The distance sensor may be separately disposed or included and be disposed in the front camera and/or the rear camera. For another example, the electronic device 100 may include an illuminance sensor that is capable of measuring an illuminance around the electronic device 100.

In an embodiment, at least one physical key may be disposed on a side portion of the electronic device 100. For example, a first function key 151 for turning the display 110 on or off or for turning the power of the electronic device 100 on or off may be disposed at a right edge with respect to the front surface of the electronic device 100. In an embodiment, a second function key 152 for controlling volume or controlling screen brightness, etc. of the electronic device 100 may be disposed at a left edge with respect to the front surface of the electronic device 100. In addition, an additional button or key may be disposed on the front surface or rear surface of the electronic device 100. For example, a physical button or a touch button mapped to a specific function may be disposed in a lower region of the front bezel region 190.

The electronic device 100 illustrated in FIG. 1 corresponds to one example, and does not limit a form of a device to which a technological spirit disclosed in the present disclosure is applied. For example, by adopting a flexible display and a hinge structure, the technological spirit of the present disclosure may be applied to a foldable electronic device that may be folded horizontally or vertically, a rollable electronic device that may be rolled, a tablet, or a notebook computer.

Referring to FIG. 1, the electronic device 100 of an embodiment may include the camera module 180. The camera module 180 may include a lens assembly 111 (e.g., a lens assembly 1110 of FIG. 11), a housing 113, an infrared cutoff filter 115, an image sensor 120 (e.g., an image sensor 1130 of FIG. 11), and an image signal processor (ISP) 130 (e.g., an image signal processor 1160 of FIG. 11).

In an embodiment, the lens assembly 111 may have a different number, arrangement, type, etc. of lenses according to the front camera and the rear camera. Depending on the type of the lens assembly 111, the front camera 161 and the rear camera may have different characteristics (e.g., a focal length and a maximum magnification). The lens may move forward and backward along an optical axis, and may operate to change a focal length so that a target object, which is a subject, may be clearly captured.

In an embodiment, the camera module 180 may include the housing 113 that mounts a barrel for mounting at least one or more lenses aligned on the optical axis and at least one coil and/or magnet surrounding a periphery of the barrel around the optical axis (not shown). In an embodiment, using the at least one coil and/or magnet included in the housing 113, the camera module 180 may perform a stabilization function (e.g., optical image stabilization (OIS)) for an image obtained by the image sensor 120. For example, the at least one coil may electromagnetically interact with each other under the control of a control circuit. For example, the camera module 180 may control an electromagnetic force by controlling a direction and/or intensity of a current passing through the at least one coil, under the control of a processor, and may move (rotate) the lens assembly 111 and at least a part of the housing (not shown) including the lens assembly 111 in a direction substantially perpendicular to the optical axis (not shown), using the Lorentz force based on an electromagnetic force.

In an embodiment, the camera module 180 may use a different scheme for the sake of an image stabilization function. For example, the camera module 180 may use video digital image stabilization (VDIS or DIS) or electrical image stabilization (EIS). In an embodiment, the camera module 180 may include a scheme of performing software processing for a data output value of the image sensor 120 and correcting an image shake. For example, the camera module 180 may extract a motion vector, based on a difference between frames of an image, through VDIS (or DIS), which is video digital image stabilization, and increase a sharpness of an image through image processing. Also, the camera module 180 may extract a motion vector, based on an image, through VDIS, and recognize a shaking motion of the subject itself and not only a shake of the electronic device 100.

In an embodiment, the infrared cutoff filter 115 may be disposed on an upper surface of the image sensor 120. An image of a subject passing through the lens may be partially filtered by the infrared cutoff filter 115 and then be detected by the image sensor 120.

In an embodiment, the image sensor 120 may be disposed on an upper surface of a printed circuit board 140 (e.g., a printed circuit board (PCB), a printed board assembly (PBA), a flexible PCB (FPCB), or a rigid-flex PCB (RFPCB)). The image sensor 120 may be electrically connected to the image signal processor 130 that is connected to the printed circuit board 140 by a connector. A flexible printed circuit board (FPCB), a cable, or an interface may be used as the connector.

In an embodiment, the image sensor 120 may be a complementary metal oxide semiconductor (CMOS) sensor or a charged coupled device (CCD) sensor. A plurality of unit pixels are integrated in the image sensor 120, and each unit pixel may include a micro lens, a color filter, and a photodiode. Each unit pixel is a kind of a photodetector and may convert inputted light into an electrical signal. The photodetector of each unit pixel may include a photodiode. For example, the image sensor 120 may amplify a current that is provided by light received through the lens assembly 111 through the photoelectric effect of a light receiving element. For example, each unit pixel may include a photoelectric transformation element (or a position sensitive detector (PSD)) (e.g., a PD 310 of FIG. 3) and a plurality of transistors (e.g., a reset transistor, a transfer transistor, a selection transistor, and a driver transistor). Details are described later with reference to FIG. 3 and FIG. 4.

In an embodiment, light information of a subject incident through the lens assembly 111 may be converted into an electrical signal by the image sensor 120 and be inputted to the image signal processor 130.

In an embodiment, when the image signal processor 130 and the image sensor 120 are physically separated, a sensor interface complying with an appropriate standard may electrically connect the image sensor 120 and the image signal processor 130. For example, the electronic device 100 may include a mobile industry processor interface (MIPI) that connects the image sensor 120 and the image signal processor 130. The image sensor 120 may present an image frame to the image signal processor 130 through the interface.

In an embodiment, the image signal processor 130 may perform image processing for an image frame received from the image sensor 120. A process in the image signal processor 130 may be divided into a pre-ISP (hereinafter, pre-processing) and an ISP chain (hereinafter, post-processing). Image processing before a demosaicing process may refer to pre-processing of an image, and image processing after the demosaicing process may refer to post-processing of an image. The pre-processing may include at least one of 3A processing, lens shading correction, edge enhancement, dead pixel correction, and knee correction. The 3A processing may include at least one of auto white balance (AWB), auto exposure (AE), and auto focusing (AF). The post-processing may include at least one of changing a sensor index value, changing a tuning parameter, and adjusting a screen ratio. The post-processing may include a process of processing an image frame output from the image sensor 120 or image data output from a scaler. The image signal processor 130 may adjust at least one of a contrast, a sharpness, a saturation, and dithering of an image through the post-processing process. Here, contrast, sharpness, and saturation adjustment procedures may be performed in a YUV color space, and a dithering procedure may be performed in a red green blue (RGB) color space. A part of the pre-processing may be performed during the post-processing, or a part of the post-processing may be performed during the pre-processing. Also, a part of the pre-processing may be overlapped with a part of the post-processing.

In an embodiment, the electronic device 100 may include several camera modules 180 to improve camera performance. For example, although FIG. 1 illustrates that one camera module 180 is disposed on the rear surface of the electronic device 100, this is one example, and the electronic device 100 may include a plurality of rear cameras. Also, in an embodiment, the camera module 180 may be disposed on the front surface of the electronic device 100 as well as the rear surface. For example, the electronic device 100 may further include the front camera 161 for video call or self-camera photography. The front camera 161 may support a relatively low number of pixels compared to a rear camera module. The front camera 161 may be relatively smaller in size than the camera module 180 of the rear camera.

Figure 2:
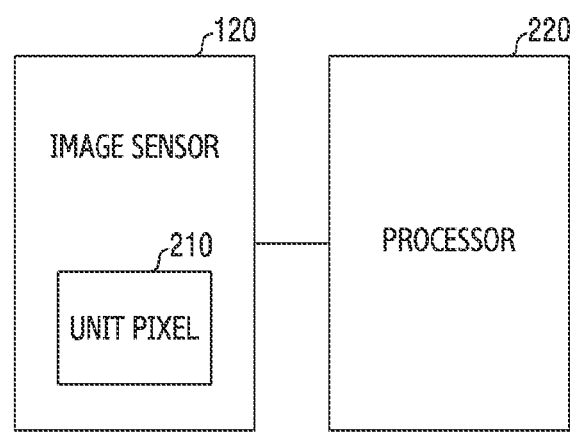
FIG. 2 is a block diagram illustrating a hardware construction of an electronic device according to an embodiment.

FIG. 2 is a block diagram illustrating a hardware construction of the electronic device 100 according to an embodiment.

Figure 10:
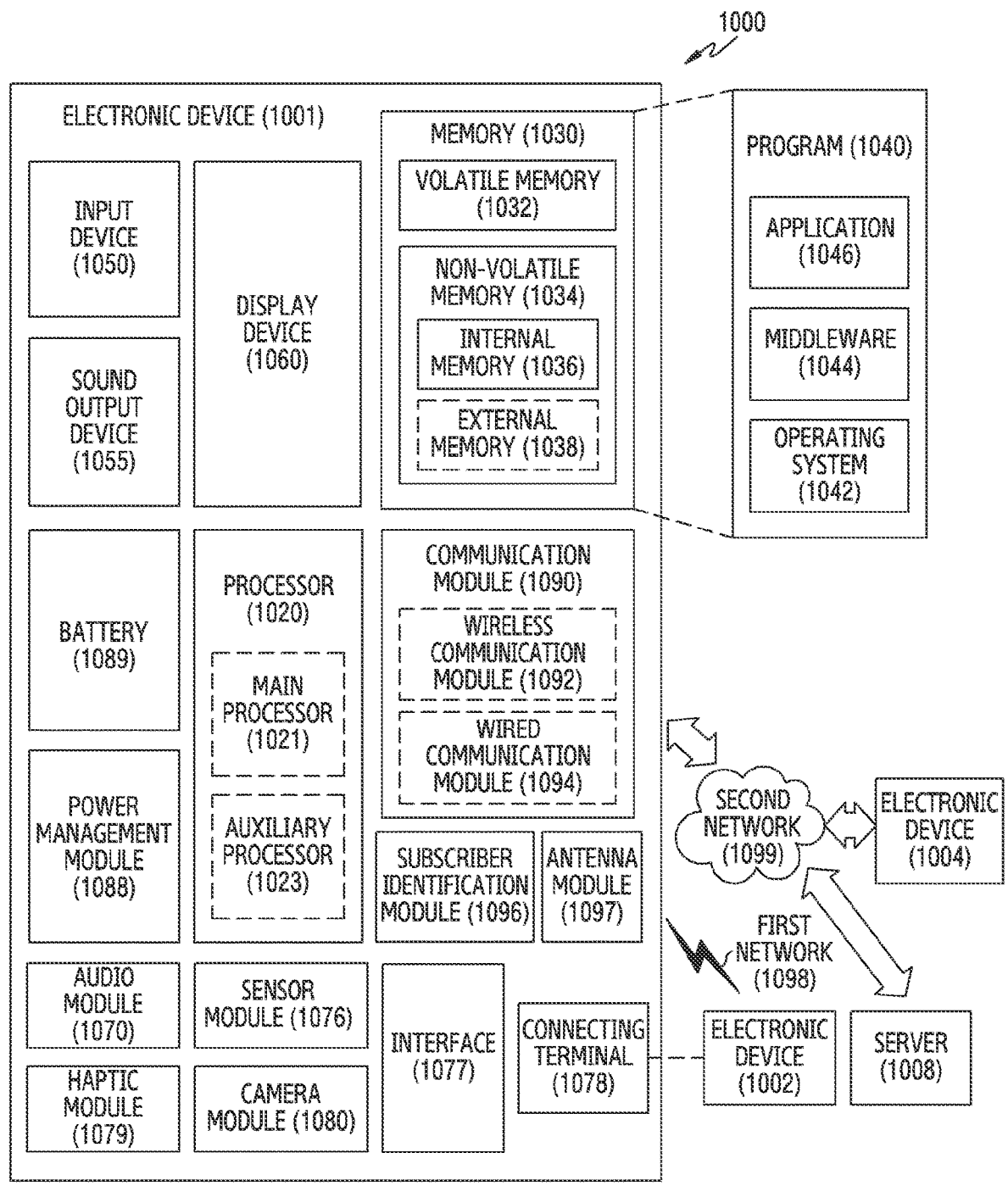
FIG. 10 is a block diagram of an electronic device in a network environment according to various embodiments.
Figure 11:
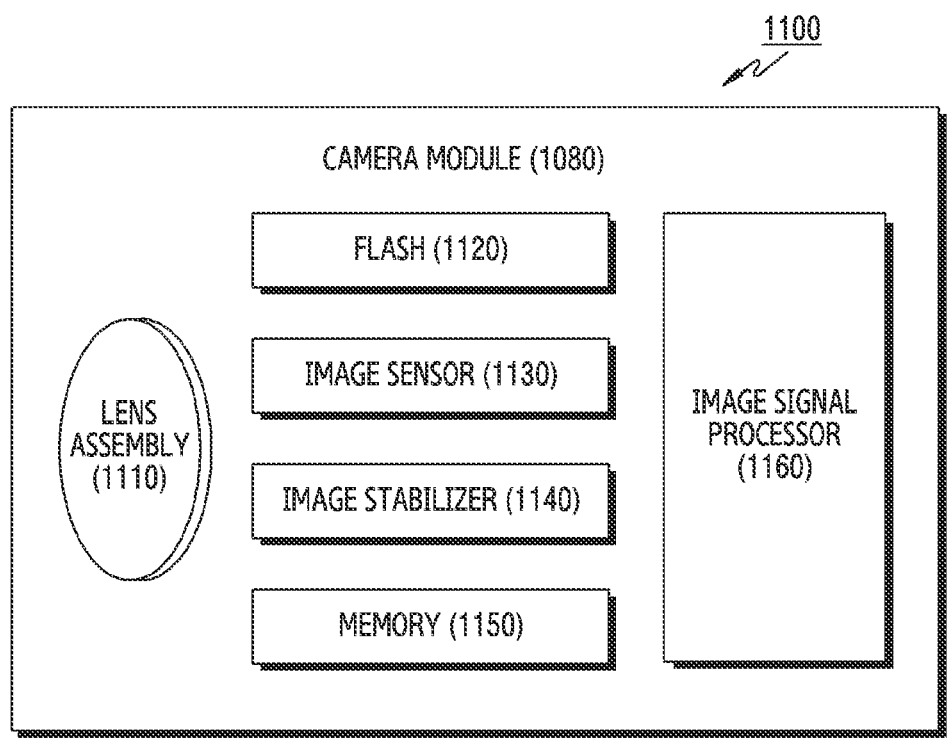
FIG. 11 is a block diagram illustrating a camera module according to various embodiments.

Referring to FIG. 2, in an embodiment, the electronic device 100 may include an image sensor 120 (e.g., the image sensor 120 of FIG. 1 or an image sensor 1130 of FIG. 11) and a processor 220 (e.g., the image signal processor 130 of FIG. 1, a processor 1020 of FIG. 10, or an image signal processor 1160 of FIG. 11).

According to an embodiment, the image sensor 120 may correspond to a CMOS image sensor. Light information of a subject incident through the lens assembly 111 may be converted into an electrical signal by the image sensor 120 and be presented to the processor 220.

According to an embodiment, the image sensor 120 may include a unit pixel 210. The image sensor 120 may include a plurality of unit pixels 210. An internal circuit diagram of the unit pixel 210 is described later with reference to FIG. 3 and FIG. 4.

According to an embodiment, the image sensor 120 or the unit pixel 210 of the image sensor 120 may read out data inputted to the unit pixel 210 with different conversion gains. The image sensor 120 may read out light quantity data inputted to the unit pixel 210 with a high conversion gain (HCG) and/or a low conversion gain (LCG). The image sensor 120 may change a conversion gain for reading out the light quantity data inputted to the unit pixel 210 according to a photographing mode.

According to an embodiment, characteristics of image data obtained through the image sensor 120 may vary according to the conversion gain of the image sensor 120. For example, when a relatively dark region and a bright region are included in the entire image region obtained through the image sensor 120, image data obtained by reading out with a high conversion gain (HCG) may include image information on a subject included in the dark region, and image data obtained by reading out with a low conversion gain (LCG) may include image information on a subject included in the bright region. For another example, the image data obtained by reading out with the HCG may include an artifact (e.g., a white hole) that is provided as a pixel is saturated, and the image data obtained by reading out with the LCG may include an artifact (e.g., a black hole) that is provided due to an insufficient quantity of charges.

According to an embodiment, the image sensor 120 may obtain an image frame including an electrical signal that each unit pixel 210 of the image sensor 120 outputs by light incident through the lens assembly 111. For example, the image sensor 120 may obtain an image frame with an improved quality, based on image data obtained by reading out with an HCG and an LCG respectively. The image frame may include a color value of each unit pixel 210. The color value may include color information and brightness information. For example, when a color filter array includes red (R), green (G), and blue (B) colors, image data of the unit pixel 210 may include at least one or more color information of R, G, and B. The green, red, and blue are only examples of the color values, and the color values are not limited. The color value may be at least one of red, green, blue, yellow, emerald, white, cyan, or magenta. According to various embodiments, the color filter array may include a color filter array of a red, green blue (RGB) pattern, a red, green, blue, emerald (RGBE) pattern, a cyan, yellow, magenta (CYM) pattern, a cyan, yellow, green, magenta (CYGM) pattern, or a red, green, blue, white (RGBW) pattern.

According to an embodiment, the color filter array of the image sensor 120 may be arranged in various patterns. For example, the image sensor 120 may include a Bayer pattern, a tetra pattern, a quadra pattern, and/or a nona pattern. For example, the Bayer pattern may be a color filter array in which one pixel may have one color, and a pixel having one red color, a pixel having two green colors, and a pixel having one blue color are arranged to be repeated as one unit (e.g., four pixels). For example, the tetra pattern (or the quadra pattern) may be a color filter in which four pixels are arranged to have the same color, and the nona pattern may be a color filter in which nine pixels are arranged to have the same color.

According to an embodiment, the processor 220 may be understood to include at least one processor. For example, the processor 220 may include at least one of an application processor (AP), an image signal processor (ISP) 130, and a communication processor (CP).

According to an embodiment, the processor 220 may include the image signal processor 130 and the AP, and the image sensor 120 may present an image frame to the image signal processor 130. The image signal processor 130 may present the image frame received from the image sensor 120, to the AP. According to another embodiment, the processor 220 may mean the AP, and the image sensor 120 may directly present an image frame to the AP as well.

According to an embodiment, the processor 220 may execute/control various functions supported by the electronic device 100. For example, the processor 220 may execute an application by executing a code written in a programming language stored in a memory, and may control various hardware elements. For example, the processor 220 may execute an application supporting a photographing function stored in the memory. Also, the processor 220 may execute the camera module 180 and set and support an appropriate photographing mode wherein the camera module 180 may perform an operation intended by a user.

Figure 3:
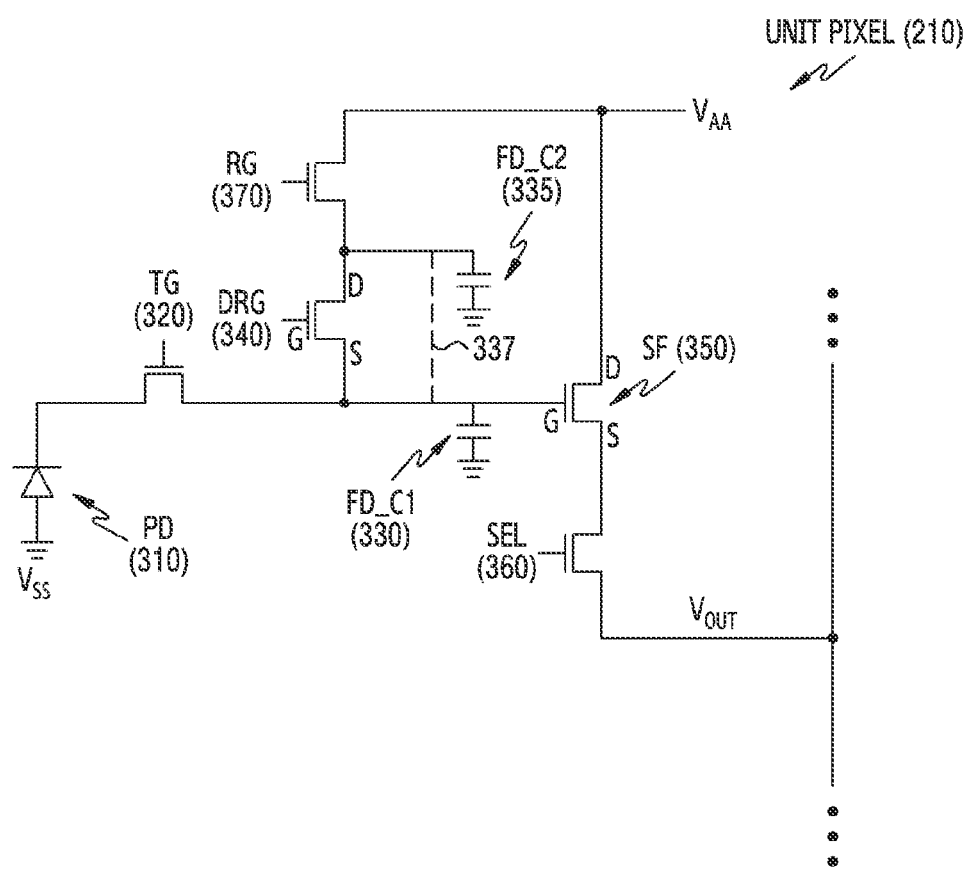
FIG. 3 is an internal circuit diagram of a unit pixel of an image sensor capable of adjusting a conversion gain according to an embodiment.

FIG. 3 is an internal circuit diagram of a unit pixel 210 of an image sensor 120 capable of adjusting a conversion gain according to an embodiment. According to an embodiment, the unit pixel 210 may include a photodiode (PD) 310, a transfer gate (TG) 320, floating diffusion (FD) 330 and 335, a dynamic range gate (DRG) 340, a source follower (SF) 350, a row select (hereinafter, SEL) 360, and a reset gate (RG) 370.

According to an embodiment, the image sensor 120 may accumulate charges corresponding to light that is incident on the image sensor 120 through the PD 310. A quantity of charges accumulated in the PD 310 may be referred to as light quantity data. FIG. 3 shows that the unit pixel 210 includes one PD 310, but this is one example, and the unit pixel 210 may include two or more PDs. The two or more PDs are described later with reference to FIG. 4.

According to an embodiment, charges accumulated in the PD 310 during an exposure time may move to the FD 330 and 335 while the TG 320 is On. According to an embodiment, the image sensor 120 may obtain analog data corresponding to the charges moved to the FD 330 and 335. For example, the analog data may include information on a quantity of charges accumulated in the PD 310 during the exposure time. For example, the image sensor 120 may control the TG 320 to obtain analog data corresponding to light quantity data obtained through the PD 310. The image sensor 120 may obtain light quantity data through the PD 310 during the exposure time, and when the image sensor 120 turns the TG 320 On, the image sensor 120 may obtain analog data, based on the light quantity data obtained through the PD 310.

According to an embodiment, the charges stored in the FD 330 and 335 may be read out through the SF 350 and be outputted as an electrical signal (Vout). According to an embodiment, the image sensor 120 may change the SEL 360 from an Off state to an On state in order to output image data of a specific row. According to an embodiment, the image sensor 120 may further include an analog digital converter (ADC) electrically connected to each of the unit pixels 210, and may digitally convert analog data through the ADC to thereby obtain digital data. In the present disclosure, the analog data and/or the digital data may be referred to as image data.

According to an embodiment, the image sensor 120 may perform a correlated double sampling (CDS) operation to reduce noise. For example, the image sensor 120 may turn the RG 370 On and reset data accumulated in the FD 330 and 335, and read out the reset data remaining after the reset. After turning the RG 370 Off, the image sensor 120 may move the charges accumulated in the PD 310 to the FD 330 and 335, and may read out the charges moved to the FD 330 and 335 and thereby obtain readout data. The image sensor 120 may obtain image data, based on a difference between the readout data and the reset data.

According to an embodiment, the image sensor 120 may include the DRG 340 and two FD regions. The conversion gain of the image sensor 120 may vary depending on the size of an FD storage space. The image sensor 120 may read out with an HCG when the size of the FD storage space is small, and with an LCG when the size of the FD storage space is large. For example, the FD is distinguished into FD_C1 330 and FD_C2 335, and the image sensor 120 may correspond to the HCG when the image sensor 120 reads out the charges stored in the FD_C1 330, and the image sensor 120 may correspond to the LCG when the image sensor 120 reads out the charges stored in the FD_C1 330 and the FD_C2 335.

According to an embodiment, the image sensor 120 may adjust a conversion gain according to the DRG 340 being On or Off. For example, when the DRG 340 is Off, the conversion gain of the image sensor 120 may be an HCG, and when the DRG 340 is On, the conversion gain of the image sensor 120 may be an LCG.

According to an embodiment, the image sensor 120 may read out light quantity data inputted to the unit pixel 210 by one exposure with an HCG, and then read out with an LCG. The image sensor 120 may read out the light quantity data inputted to the unit pixel 210 by one exposure, twice or more, with the HCG, and read out the light quantity data once with the LCG.

According to an embodiment, the image sensor 120 may include a structure in which charges overflow into the FD_C2 335 when charges are fully filled in the FD_C1 330. The unit pixel 210 may include a structure for reading out light quantity data inputted through one exposure with an HCG and an LCG. For example, the image sensor 120 may include a predetermined path 337 connecting the FD_C1 330 and the FD_C2 335, and the charges fully filled in the FD_C1 330 may overflow into the FD_C2 335 through the predetermined path 337. For another example, the charges fully filled in the FD_C1 330 may be introduced into the FD_C2 335 through an existing path formed in the image sensor 120. For further example, the charges fully filled in the FD_C1 330 may overflow into the FD_C2 335 through predetermined path (not shown). In addition to this, the structure in which the charges overflow into the FD_C2 335 when the charges are fully filled in the FD_C1 330 may be variously implemented by a person having ordinary skill in the art.

Figure 4:
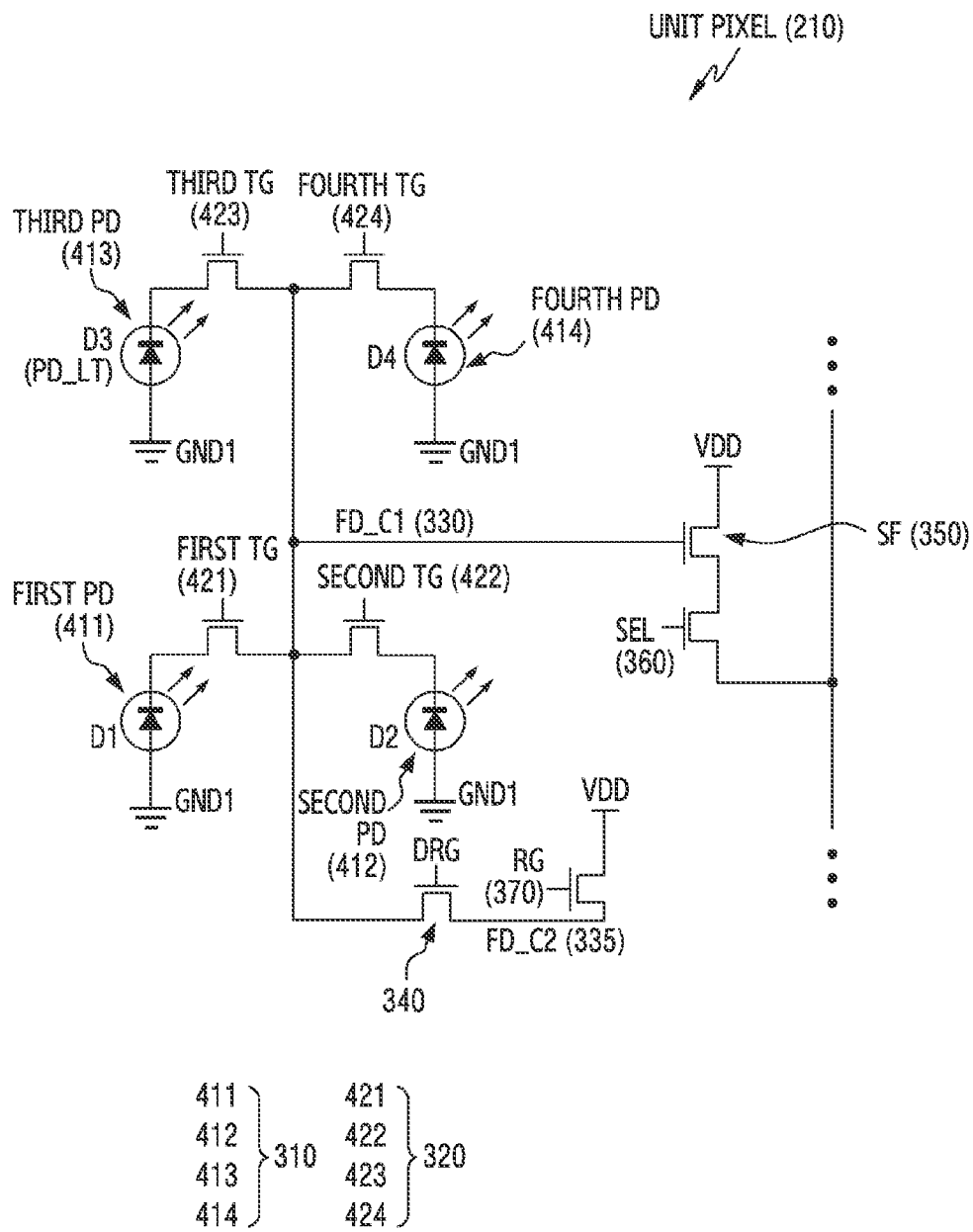
FIG. 4 is an internal circuit diagram of a unit pixel of an image sensor capable of adjusting a conversion gain according to an embodiment.

FIG. 4 is an internal circuit diagram of a unit pixel 210 of an image sensor 120 that is capable of adjusting a conversion gain according to an embodiment. The internal circuit diagram of the unit pixel 210 illustrated in FIG. 4 may be understood to illustrate the circuit diagram illustrated in FIG. 3 in more detail.

Referring to FIG. 4, compared with the circuit diagram of FIG. 3, the unit pixel 210 may include a plurality of PDs 310, and a corresponding plurality of TGs 320 where each TG 320 corresponds to each of the PDs 310.

According to an embodiment, the unit pixel 210 may include four PDs 310. For example, the unit pixel 210 may include four PDs having a 2×2 array (e.g., a first PD 411, a second PD 412, a third PD 413, and a fourth PD 414). According to an embodiment, the unit pixel 210 may include four PDs 310 having a 2×2 array and the FD 330 and 335 connected to the four PDs 310. For example, the unit pixel 210 may mean a micro lens unit or a color filter unit. According to an embodiment, the unit pixel 210 may include five or more PDs 310 as well. For example, the unit pixel 210 may include nine PDs 310 having a 3×3 array. The unit pixel 210 may include the nine PDs 310 having the 3×3 array and one FD (e.g., FD_C1 330) connected to the nine PDs 310. For another example, the unit pixel 210 may include 16 PDs 310 having a 4×4 array, or may include 8 PDs 310 having a 2×4 array. Although the present document has been described on the assumption that the unit pixel 210 includes the four PDs 310 having the 2×2 array, this is one example and various embodiments capable of being implemented by an ordinary technician are possible.

According to an embodiment, the image sensor 120 may obtain image data corresponding to light quantity data inputted to the at least one PD 310. For example, the image sensor 120 may control the TG 320 to obtain analog data corresponding to light quantity data obtained through at least one of the PDs 310. For example, the image sensor 120 may obtain light quantity data through the first PD 411, the second PD 412, the third PD 413, and the fourth PD 414 during an exposure time. When the image sensor 120 turns the first TG 421 On, the image sensor 120 may obtain image data, based on the light quantity data obtained through the first PD 411. When the image sensor 120 turns the first TG 421 On, the second TG 422 On, the third TG 423 On, and the fourth TG 424 On, the image sensor 120 may obtain image data, based on the light quantity data obtained through the first PD 411, the second PD 412, the third PD 413, and the fourth PD 414.

Figure 5:
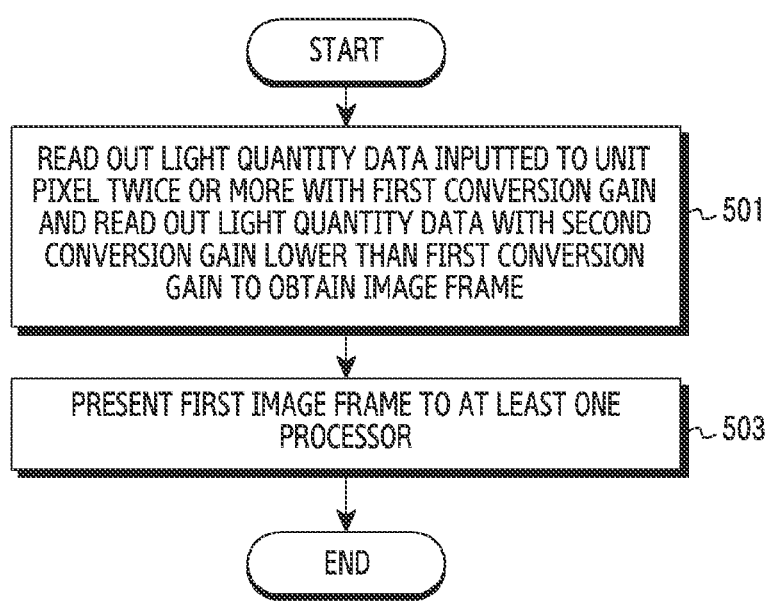
FIG. 5 is a flowchart illustrating an operation of obtaining an HDR image with an improved quality in an electronic device according to an embodiment.

FIG. 5 is a flowchart illustrating an operation of obtaining an HDR image with an improved quality in the electronic device 100 according to an embodiment. Operations illustrated in FIG. 5 may be performed by the image sensor 120 of FIG. 1 and FIG. 2 or the unit pixel 210 of FIG. 2 to FIG. 4.

According to an embodiment, the image sensor 120 may receive, by the unit pixel 210, light quantity data corresponding to light information of a subject through exposure of the unit pixel 210.

According to an embodiment, in operation 501, the image sensor 120 may read out the light quantity data inputted to the unit pixel 210 twice or more with a first conversion gain, and read out the light quantity data with a second conversion gain lower than the first conversion gain to obtain a first image frame. According to an embodiment, the image sensor 120 may read out the light quantity data inputted to the unit pixel 210 twice or more with the first conversion gain, and read out the light quantity data once with the second conversion gain to obtain the first image frame. According to another embodiment, the image sensor 120 may read out the light quantity data inputted to the unit pixel 210 twice or more with the first conversion gain, and read out the light quantity data twice or more with the second conversion gain to obtain the first image frame as well.

According to an embodiment, the image sensor 120 may obtain the first image frame based on the light quantity data inputted to the unit pixel 210 through one exposure. Compared with an MF HDR mode in which an HDR image is obtained using a plurality of images having different exposure times, the image sensor 120 of the present disclosure may obtain a first image frame that is the HDR image, based on the light quantity data obtained through one exposure, and operations of the present disclosure of obtaining the HDR image through one exposure (operations of FIG. 5 to FIG. 6) may be referred to as a single frame high dynamic range (SF HDR) mode.

According to an embodiment, the first conversion gain may be a high conversion gain (HCG), and the second conversion gain lower than the first conversion gain may be a low conversion gain (LCG).

According to an embodiment, the unit pixel 210 may accumulate, in the PD 310, charges corresponding to a quantity of light incident during an exposure time of the image sensor 120. The image sensor 120 may control an On/Off state of the TG 320 and move the charges accumulated in the PD 310 to the FD_C1 330. The image sensor 120 may read out the charges stored in the FD_C1 330 twice or more with the first conversion gain (HCG). The image sensor 120 may turn the DRG 340 On and read out the charges stored in the FD_C1 330 and FD_C2 335 with the second conversion gain (LCG). After reading out the light quantity data twice or more with the first conversion gain and reading out the light quantity data with the second conversion gain, the image sensor 120 may turn the RG 370 On and reset the charges stored in the FD_C1 330 and the FD_C2 335.

According to an embodiment, the image sensor 120 may obtain a first image frame based on image data that is obtained by reading out the light quantity data inputted to the unit pixel 210 twice or more with the first conversion gain and by reading out the light quantity data with the second conversion gain. An operation in which the image sensor 120 obtains the first image frame is described later with reference to FIG. 6.

According to an embodiment, in operation 503, the image sensor 120 may present the first image frame to the processor 220. For example, the electronic device 100 may include an interface (e.g., MIPI) connecting the image sensor 120 and the processor 220, and the image sensor 120 may present the first image frame to the processor 220 through the interface.

Figure 6:
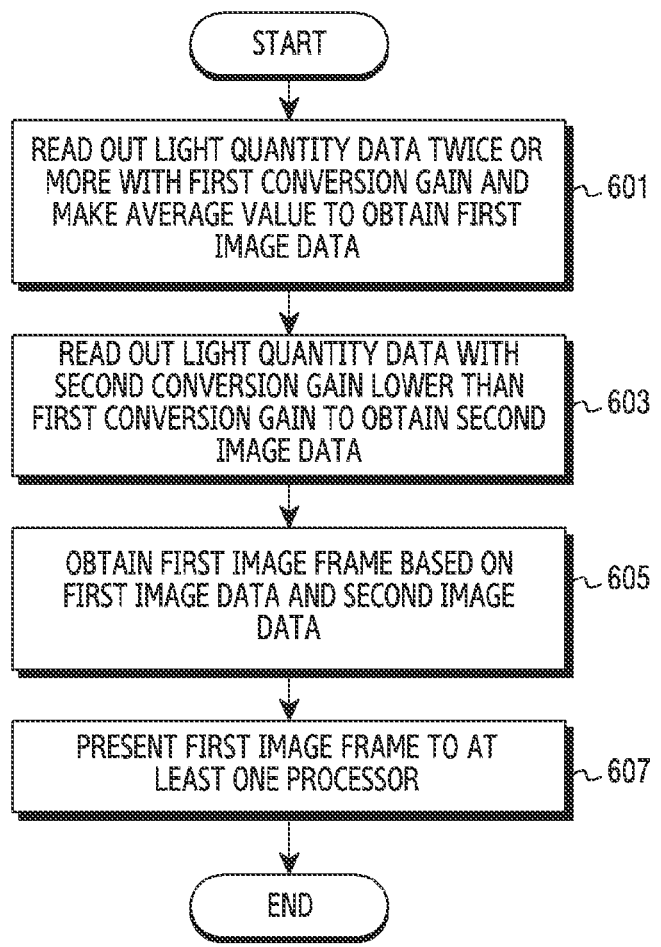
FIG. 6 is a flowchart illustrating an operation of obtaining an HDR image with an improved quality in an electronic device according to an embodiment.

FIG. 6 is a flowchart illustrating an operation of obtaining an HDR image with an improved quality in an electronic device according to an embodiment. Operations illustrated in FIG. 6 may be performed by the image sensor 120 of FIG. 1 and FIG. 2 or the unit pixel 210 of FIG. 2 to FIG. 4.

According to an embodiment, in operation 601, the image sensor 120 may read out light quantity data inputted to the unit pixel 210 twice or more with a first conversion gain and make an average value to obtain first image data.

According to an embodiment, the image sensor 120 may read out the light quantity data inputted to the unit pixel 210 several times with the first conversion gain, and digitally convert data obtained by reading out several times, through an ADC, respectively. The image sensor 120 may perform an averaging operation for each data obtained by digitally converting through the ADC. The image sensor 120 may thus obtain first image data, which is average data of data obtained by reading out the light quantity data twice or more with the first conversion gain.

According to an embodiment, the image sensor 120 may read out the light quantity data inputted to the unit pixel 210 twice or more with the first conversion gain and determine an average value to decrease an amount of noise included in the first image data. For example, when a quantity of light incident on the unit pixel 210 of the image sensor 120 is small, the effect of a readout noise provided in an operation in which the image sensor 120 reads out light quantity data inputted to the unit pixel 210 may increase. The image sensor 120 of the present disclosure may decrease the readout noise by reading out the light quantity data twice or more with an HCG and determining an average value. Accordingly, when the electronic device 100 obtains the first image frame based on the first image data whose readout noise is reduced in operation 503 of FIG. 5 or operation 605 of FIG. 6, the electronic device 100 may obtain the first image frame whose noise is reduced even in a low-illuminance environment.

According to an embodiment, in operation 603, the image sensor 120 may read out the light quantity data with a second conversion gain lower than the first conversion gain and thereby obtain second image data. For example, the image sensor 120 may read out the light quantity data once with the second conversion gain and thereby obtain the second image data. For another example, the image sensor 120 may read out the light quantity data twice or more with the second conversion gain and make an average value to thereby obtain the second image data as well.

According to an embodiment, in operation 605, the image sensor 120 may obtain a first image frame based on the first image data and the second image data. The image sensor 120 may obtain the first image frame based on light quantity data inputted to the unit pixel 210 through one exposure.

According to an embodiment, the image sensor 120 may synthesize the first image data and the second image data and thereby obtain the first image frame. For example, the image sensor 120 may obtain a first region of the first image frame based on the first image data and thereby obtain a second region distinguished from the first region of the first image frame based on the second image data. The image sensor 120 may obtain the first image frame whose dynamic range (DR) is extended, using the first image data for a partial region of an image corresponding to a subject that is being photographed and using the second image data for the remaining partial region According to an embodiment, the DR of the first image frame may be wider than a DR of the first image data and a DR of the second image data. For example, an artifact such as a white hole provided due to pixel saturation may be included in the first image data from which the image sensor 120 reads out light quantity data with an HCG. Also, an artifact such as a black hole provided due to an insufficient quantity of charges corresponding to a light quantity may be included in the second image data from which the image sensor 120 reads out the light quantity data with an LCG. However, the image sensor 120 may provide the first image frame based on a region (first region) not including an artifact among the first image data and a region (second region) not including an artifact among the second image data. Accordingly, the first image frame may be an HDR image having a wider DR compared to a DR of the first image data or the second image data.

According to an embodiment, in operation 607, the image sensor 120 may present the first image frame to the processor 220. Operation 607 may correspond to operation 503 of FIG. 5.

According to an embodiment, the electronic device 100 may further include an illuminance sensor electrically connected to the processor 220. The processor 220 may measure an illuminance around the electronic device 100 using the illuminance sensor, and in response to the illuminance satisfying a specified condition, may control the image sensor 120 to perform operations 501 to 503 of FIG. 5 or operations 601 to 607 of FIG. 6. For example, when the processor 220 determines that the illuminance around the electronic device 100 is less than a threshold value, the processor 220 may control the image sensor 120 to perform an SF HDR mode (e.g., perform the operations of FIG. 5 and/or FIG. 6) and thereby obtain the first image frame whose DR is extended and noise is reduced.

Figure 7:
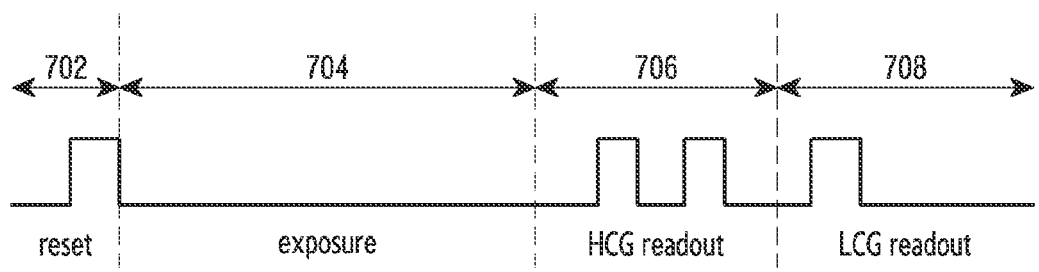
FIG. 7 is a timing diagram illustrating an operation of reading out light quantity data with a first conversion gain and a second conversion gain from a unit pixel of an image sensor according to an embodiment.

FIG. 7 is a timing diagram illustrating an operation of reading out light quantity data with a first conversion gain and a second conversion gain in the unit pixel 210 of the image sensor 120 according to an embodiment.

Referring to FIG. 7, the image sensor 120 may reset the unit pixel 210 during a first time duration 702. For example, the image sensor 120 may turn the RG 370 of the unit pixel 210 On and reset charges stored in the FD 330 and 335.

Referring to FIG. 7, the image sensor 120 may expose the unit pixel 210 during a second time duration 704. The image sensor 120 may expose the unit pixel 210 during a specified duration among the second time duration 704. For example, the image sensor 120 may expose the unit pixel 210 during the entire duration of the second time duration 704. For another example, the image sensor 120 may expose the unit pixel 210 during a specific duration corresponding to a specific exposure time (e.g., 0.5 seconds) dependent on the control of the processor 220 among the second time duration 704 as well.

Referring to FIG. 7, the image sensor 120 may read out the light quantity data inputted to the unit pixel 210 twice or more with a first conversion gain (e.g., an HCG), during a third time duration 706. For example, the image sensor 120 may turn the TG 320 of the unit pixel 210 On and read out charges stored in the FD_C1 330 twice or more while the DRG 340 is Off. In FIG. 7, it is illustrated that the image sensor 120 reads out the light quantity data twice with the first conversion gain, but the image sensor 120 may read out the light quantity data three times or more with the first conversion gain.

Referring to FIG. 7, the image sensor 120 may read out light quantity data inputted to the unit pixel 210 with a second conversion gain (e.g., an LCG), during a fourth time duration 708. For example, the image sensor 120 may turn the DRG 340 of the unit pixel 210 On and read out charges stored in the FD_C1 330 and the FD_C2 335. In FIG. 7, it is illustrated that the image sensor 120 reads out the light quantity data once with the second conversion gain, but the image sensor 120 may read out the light quantity data twice or more with the second conversion gain as well Referring to FIG. 7, the image sensor 120 may read out the light quantity data obtained by exposing the unit pixel 210 once during the first time duration 702, with the first conversion gain and the second conversion gain, during the third time duration 706 and the fourth time duration 708, respectively. That is, since the image sensor 120 may obtain an HDR image through one exposure, the operations of the image sensor 120 of FIG. 5 to FIG. 6 may be referred to as an SF HDR mode.

According to an embodiment, the image sensor 120 may obtain a first image frame based on the first image data obtained by reading out twice or more with the first conversion gain and then making an average value during the third time duration 706, and the second image data obtained by reading out with the second conversion gain during the fourth time duration 708. An operation of obtaining the first image frame is described with reference to FIG. 8 to FIG. 9.

Figure 8:
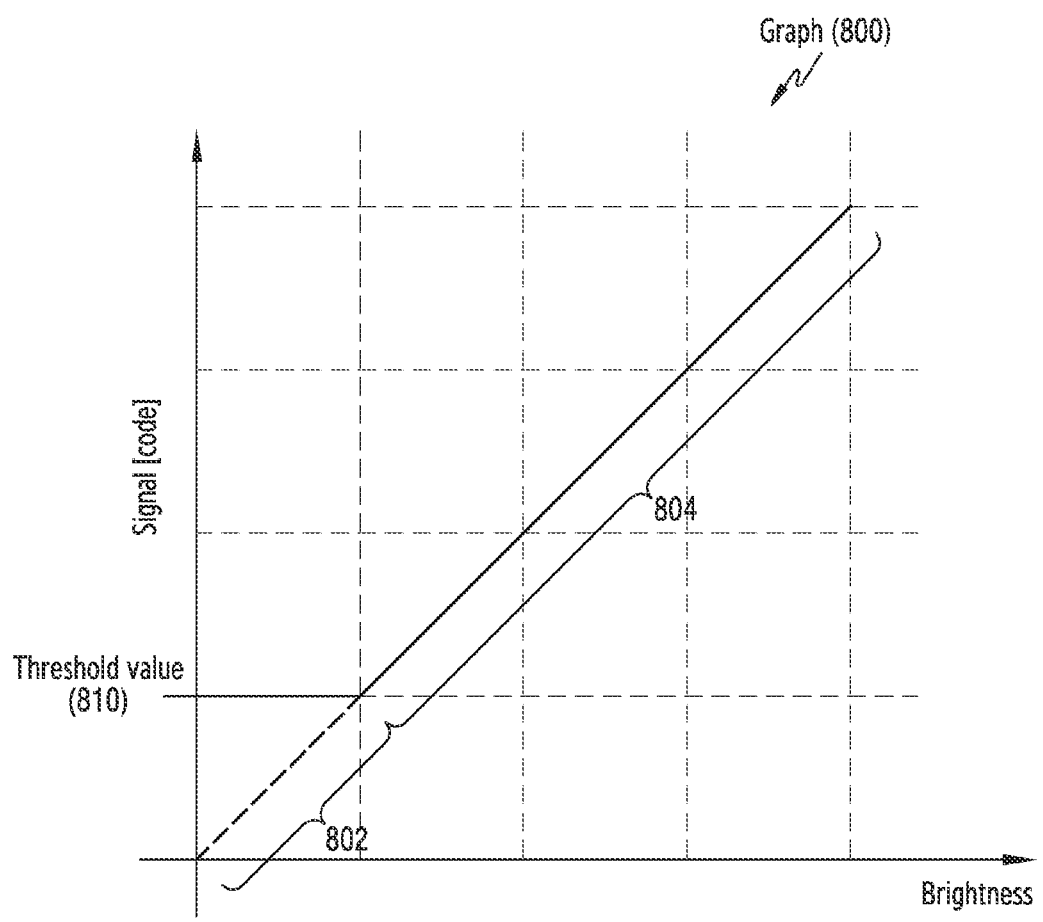
FIG. 8 illustrates an example in which an image sensor provides a first image frame according to an embodiment.

FIG. 8 illustrates an example in which the image sensor 120 provides a first image frame according to an embodiment.

Referring to FIG. 8, graph 800 indicates that a signal value of image data obtained in a corresponding region is increased as a brightness of a partial region of an image obtained by the electronic device 100 through the image sensor 120 is increased. Also, graph 800 may be divided into a first duration 802 and a second duration 804 with a criterion of a threshold brightness and/or a threshold magnitude of the signal value.

According to an embodiment, the image sensor 120 may provide a first image frame based on first image data obtained by reading out twice or more with a first conversion gain and determining an average value and second image data obtained by reading out with a second conversion gain. For example, the image sensor 120 may obtain a first region of the first image frame based on the first image data, and may obtain a second region distinguished from the first region of the first image frame based on the second image data.

According to an embodiment, the image sensor 120 may distinguish the first region and the second region with a criterion of magnitudes of signal values of the first image data and/or second image data. For example, the image sensor 120 may determine a region in which the signal value of the first image data (or the second image data) is less than a threshold value 810 as the first region, and determine a region in which the signal value of the first image data (or the second image data) is equal to or is greater than the threshold value 810 as the second region. That is, the image sensor 120 may determine an image region corresponding to the first duration 802 as the first region, and an image region corresponding to the second duration 804 as the second region, with a criterion of the signal value of the first image data (or second image data).

According to an embodiment, the image sensor 120 may synthesize the first image data corresponding to the first region and the second image data corresponding to the second region to obtain a first image frame. The first image frame may have a wider DR than a DR of the first image data or a DR of the second image data. Also, since the first image frame of the present disclosure is an image frame provided based on the first image data obtained by reading out light quantity data twice or more with a first conversion gain and determining an average value, the first image frame of the present disclosure may include less dark noise compared to an image frame that is provided based on data obtained by reading out once with the first conversion gain according to the prior art.

Figure 9:
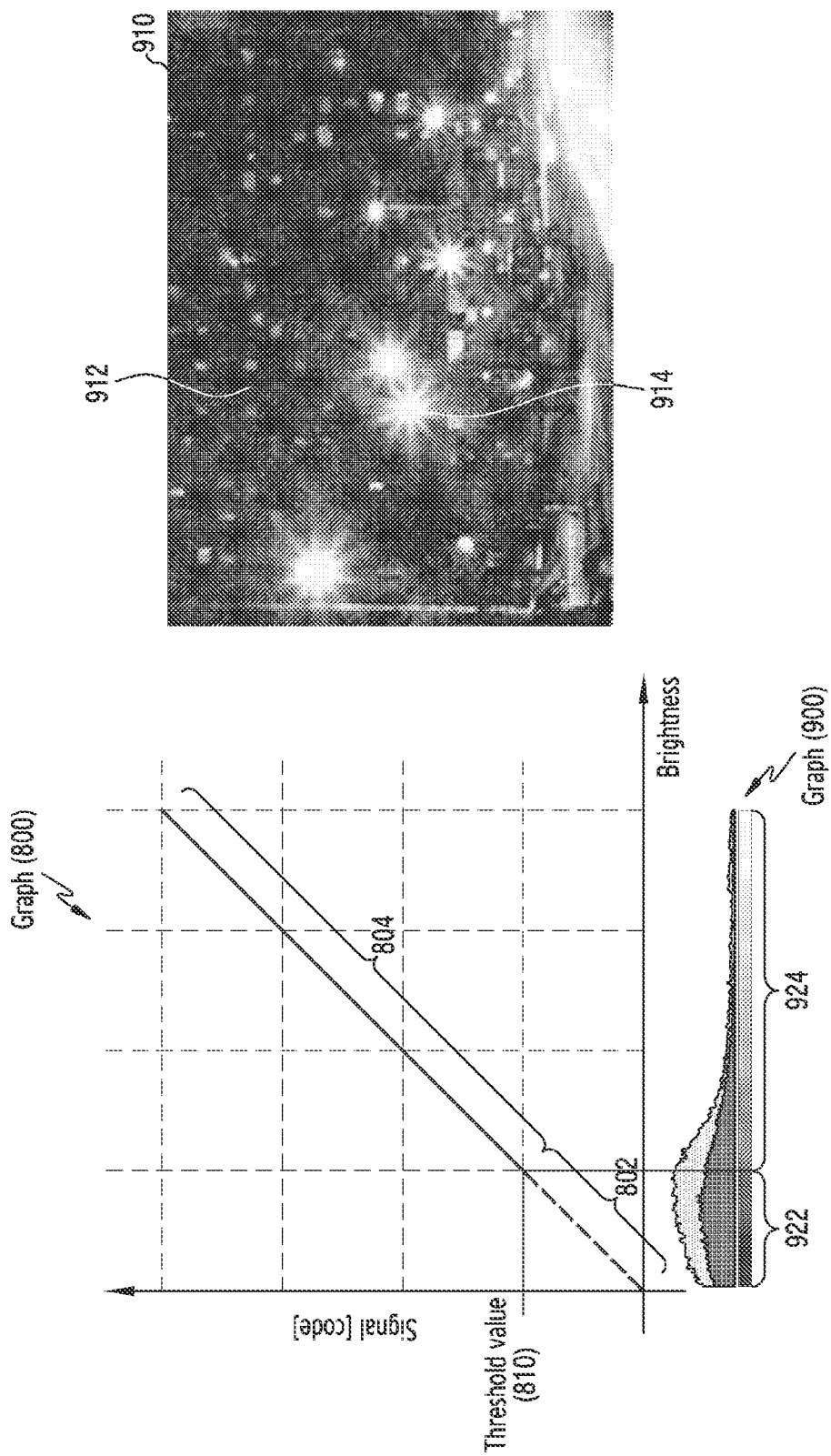
FIG. 9 illustrates an example of a first image frame provided by an image sensor according to an embodiment.

FIG. 9 illustrates an example of a first image frame 910 provided by the image sensor 120 according to an embodiment.

Referring to FIG. 9, graph 800 is graph 800 of FIG. 8, and graph 900 represents a distribution dependent on a brightness of a scene photographed by the electronic device 100. For example, when a scene that is being photographed by the electronic device 100 is being photographed at night or in low-light conditions, graph 900 may represent a brightness distribution corresponding to a brightness that is less than a predetermined brightness level.

According to an embodiment, the image sensor 120 may determine, as the first region, a region in which a signal value of the first image data (or the second image data) is less than the threshold value 810 or a region having a brightness level that is less than the threshold brightness as indicated by reference numeral 922. Also, the image sensor 120 may determine, as the second region, a region in which the signal value of the first image data (or the second image data) is equal to or is greater than the threshold value 810 or a region having a brightness level that is equal to or greater than the threshold brightness as indicated by reference numeral 924.

According to an embodiment, the image sensor 120 may obtain or identify a first region 912 of the first image frame 910 based on the first image data, and may obtain or identify a second region 914 of the first image frame 910 based on the second image data. The first image frame 910 obtained by the image sensor 120 based on the first image data and the second image data may be an image whose quality is improved in that noise and an appearance of an artifact are reduced and a DR is wide compared to the first image data, the second image data, or an image obtained according to the prior art.

An electronic device of an embodiment may include an image sensor including a unit pixel of a plurality of unit pixels, and at least one processor electrically connected to the image sensor. The image sensor may read out light quantity data inputted to the unit pixel twice or more with a first conversion gain, and read out the light quantity data with a second conversion gain lower than the first conversion gain to obtain a first image frame, and present the first image frame to the at least one processor.

In the electronic device of an embodiment, the image sensor may read out the light quantity data once with the second conversion gain.

In the electronic device of an embodiment, the image sensor may read out the light quantity data twice or more with the first conversion gain and make an average value to obtain first image data, and read out the light quantity data with the second conversion gain to obtain second image data and thereby obtain the first image frame based on the first image data and the second image data.

In the electronic device of an embodiment, the image sensor may synthesize the first image data and the second image data to obtain the first image frame.

In the electronic device of an embodiment, the image sensor may obtain a first region of the first image frame based on the first image data and thereby obtain a second region distinguished from the first region among the first image frame based on the second image data.

The electronic device of an embodiment may further include an illuminance sensor electrically connected to the at least one processor. The at least one processor may measure an illuminance around the electronic device using the illuminance sensor, and in response to the illuminance satisfying a specified condition, control the image sensor to read out the light quantity data twice or more with the first conversion gain and read out the light quantity data with the second conversion gain.

In the electronic device of an embodiment, the unit pixel may include a structure for reading out the light quantity data inputted through one exposure with the first conversion gain and the second conversion gain.

In the electronic device of an embodiment, the unit pixel may include four photo diodes (PDs) having a 2×2 array, and a floating diffusion (FD) connected to the four PDs.

An operating method of an electronic device of an embodiment may include reading out, by an image sensor included in the electronic device, light quantity data inputted to a unit pixel twice or more with a first conversion gain, and reading out the light quantity data with a second conversion gain lower than the first conversion gain to obtain a first image frame, and presenting, by the image sensor, the first image frame to at least one processor included in the electronic device.

In the operating method of the electronic device of an embodiment, reading out, by the image sensor, the light quantity data with the second conversion gain may be reading out, by the image sensor, the light quantity data once with the second conversion gain.

In the operating method of the electronic device of an embodiment, obtaining, by the image sensor, the first image frame may include reading out, by the image sensor, the light quantity data twice or more with the first conversion gain and making an average value to obtain first image data, and reading out, by the image sensor, the light quantity data with the second conversion gain to obtain second image data and thereby obtaining the first image frame based on the first image data and the second image data.

In the operating method of the electronic device of an embodiment, obtaining the first image frame based on the first image data and the second image data may include obtaining, by the image sensor, a first region of the first image frame based on the first image data and thereby obtaining a second region distinguished from the first region among the first image frame based on the second image data.

The operating method of the electronic device of an embodiment may include measuring an illuminance around the electronic device using an illuminance sensor included in the electronic device, and in response to the illuminance satisfying a specified condition, controlling the image sensor to read out the light quantity data twice or more with the first conversion gain and read out the light quantity data with the second conversion gain.

In the operating method of the electronic device of an embodiment, the unit pixel may include a structure for reading out the light quantity data inputted through one exposure with the first conversion gain and the second conversion gain.

In the operating method of the electronic device of an embodiment, the unit pixel may include four PDs having a 2×2 array, and an FD connected to the four PDs, and the method may include exposing the four PDs and thereby obtaining the light quantity data.

An electronic device of an embodiment may include an image sensor including a unit pixel of a plurality of unit pixels, and at least one processor electrically connected to the image sensor. The image sensor may read out light quantity data inputted to the unit pixel twice or more with a first conversion gain and make an average value to obtain first image data, and read out the light quantity data with a second conversion gain lower than the first conversion gain to obtain second image data and thereby obtain a first image frame based on the first image data and the second image data, and present the first image frame to the at least one processor.

In the electronic device of an embodiment, the image sensor may read out the light quantity data once with the second conversion gain to obtain the second image data.

In the electronic device of an embodiment, the image sensor may obtain the first image frame based on the light quantity data inputted to the unit pixel through one exposure.

In the electronic device of an embodiment, the unit pixel may include four PDs having a 2×2 array, and two FDs connected to the four PDs.

In the electronic device of an embodiment, the image sensor may obtain the first image frame based on light quantity data inputted to at least one of the four PDs.

An operating method of an electronic device may include reading out, by an image sensor, light quantity data inputted to a unit pixel of a plurality of unit pixels twice or more with a first conversion gain. The operating method may include reading out the light quantity data with a second conversion gain lower than the first conversion gain to obtain a first image frame. The operating method may include presenting, by the image sensor, the first image frame to at least one processor. The electronic device may include the image sensor and the at least one processor. The image sensor comprising the plurality of unit pixels.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 11 is a block diagram 1100 illustrating the camera module 1080 according to various embodiments. Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device module 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

The invention claimed is:

1. An electronic device comprising:
    an image sensor comprising a unit pixel configured by circuitry comprising floating diffusion and at least one photo diode (PD); and
    at least one processor electrically connected to the image sensor,
    the image sensor being configured to:
        store, to the floating diffusion, charges generated within one exposure period from the at least one PD,
        obtain first image data by reading out light quantity data associated with the charges generated within the one exposure period to the unit pixel twice or more with a first conversion gain based on a first size of a storage space of the floating diffusion,
        obtain second image data by reading out the light quantity data associated with the charges generated within the one exposure period with a second conversion gain lower than the first conversion gain based on a second size of the storage space different from the first size,
        obtain a first image frame based on the first image data and the second image data, wherein a dynamic range of the first image frame is wider than a dynamic range of the first image data and a dynamic range of the second image data, and
        present the first image frame to the at least one processor.

2. The electronic device of claim 1, wherein the image sensor reads out the light quantity data once with the second conversion gain.

3. The electronic device of claim 1, wherein the image sensor reads out the light quantity data twice or more with the first conversion gain and makes an average value to obtain first image data, reads out the light quantity data with the second conversion gain to obtain second image data, and obtains the first image frame based on the first image data and the second image data.

4. The electronic device of claim 3, wherein the image sensor synthesizes the first image data and the second image data to obtain the first image frame.

5. The electronic device of claim 3, wherein the image sensor obtains a first region of the first image frame based on the first image data, and obtains a second region distinguished from the first region among the first image frame based on the second image data.

6. The electronic device of claim 1, further comprising an illuminance sensor electrically connected to the at least one processor,
    wherein the at least one processor measures an illuminance around the electronic device using the illuminance sensor, and controls the image sensor to read out the light quantity data twice or more with the first conversion gain and to read out the light quantity data with the second conversion gain in response to the illuminance satisfying a specified condition.

7. The electronic device of claim 1, wherein the unit pixel comprises a structure for reading out the light quantity data associated with the charges generated within the one exposure period with the first conversion gain and the second conversion gain.

8. The electronic device of claim 1, wherein the unit pixel comprises four photo diodes (PDs) having a 2×2 array comprising the at least one PD, and the floating diffusion (FD) connected to the four PDs.

9. The electronic device of claim 1, wherein the dynamic range of the first image frame is extended using the first image data for a partial region of an image corresponding to a subject being photographed and using the second image data for a remaining partial region of the image.

10. The electronic device of claim 1, wherein the dynamic range of the first image frame is wider than a dynamic range of the first image data and a dynamic range of the second image data.

11. The electronic device of claim 1, wherein:
    the unit pixel comprises a dynamic range gate (DRG), which is turned on or off by the image sensor,
    when the DRG is off, the image sensor obtains the first image data using a high conversion gain (HCG), and
    when the DRG is on, the image sensor obtains the first image data using a low conversion gain (LCG).

12. An operating method of an electronic device comprising an image sensor and at least one processor, the method comprising:
    storing, to floating diffusion of the image sensor, charges generated within one exposure period from at least one photo diode (PD) of the image sensor; obtaining first image data by reading out, by the image sensor, light quantity data associated with the charges generated within the one exposure period to a unit pixel twice or more with a first conversion gain based on a first size of a storage of the floating diffusion;
    obtaining second image data by reading out, by the image sensor, the light quantity data associated with the charges generated within the one exposure period with a second conversion gain lower than the first conversion gain based on a second size of the storage space different from the first size;
    obtaining a first image frame based on the first image data and the second image data, wherein a dynamic range of the first image frame is wider than a dynamic range of the first image data and a dynamic range of the second image data; and
    presenting, by the image sensor, the first image frame to the at least one processor.

13. The operating method of the electronic device of claim 12, wherein the reading out, by the image sensor, the light quantity data with the second conversion gain comprises reading out, by the image sensor, the light quantity data once with the second conversion gain.

14. The operating method of the electronic device of claim 12, wherein obtaining, by the image sensor, the first image frame comprises:
    reading out, by the image sensor, the light quantity data twice or more with the first conversion gain and making an average value to obtain first image data;
    reading out, by the image sensor, the light quantity data with the second conversion gain to obtain second image data; and obtaining the first image frame based on the first image data and the second image data.

15. The operating method of the electronic device of claim 14, wherein obtaining the first image frame based on the first image data and the second image data comprises:
   obtaining, by the image sensor, a first region of the first image frame based on the first image data; and
   obtaining a second region distinguished from the first region among the first image frame based on the second image data.

16. An electronic device comprising:
   an image sensor comprising a plurality of unit pixels respectively configured by circuitry comprising floating diffusion and at least one photo diode (PD); and
   at least one processor electrically connected to the image sensor,
   wherein the image sensor is configured to:
   store, to the floating diffusion, charges generated within one exposure period from the at least one PD;
   read out light quantity data associated with the charges generated within the one exposure period to a unit pixel of the plurality of unit pixels twice or more with a first conversion gain based on a first size of a storage space of the floating diffusion and make an average value to obtain first image data;
   read out the light quantity data associated with the charges generated within the one exposure period with a second conversion gain lower than the first conversion gain based on a second size of the storage space different from the first size to obtain second image data;
   obtain a first image frame based on the first image data and the second image data, wherein a dynamic range of the first image frame is wider than a dynamic range of the first image data and a dynamic range of the second image data; and
   present the first image frame to the at least one processor.

17. The electronic device of claim 16, wherein the image sensor reads out the light quantity data once with the second conversion gain to obtain the second image data.

18. The electronic device of claim 16, wherein the image sensor obtains the first image frame based on the light quantity data inputted to the unit pixel associated with the charges generated within the one exposure period.

19. The electronic device of claim 16, wherein the unit pixel comprises four PDs having a 2×2 array comprising the at least one PD, and two floating diffusions (FDs) connected to the four PDs.

20. The electronic device of claim 19, wherein the image sensor obtains the first image frame based on light quantity data inputted to the at least one PD of the four PDs.

* * * * *